US005409187A

United States Patent [19]

Dunham

[11] Patent Number: 5,409,187
[45] Date of Patent: Apr. 25, 1995

[54] ROCKET DEPLOYMENT SYSTEM FOR PARACHUTES AND THE LIKE

[76] Inventor: John Dunham, 4910 Aircenter Cir., #102, Reno, Nev. 89502

[21] Appl. No.: 280,412

[22] Filed: Jul. 26, 1994

Related U.S. Application Data

[63] Continuation of Ser. No. 975,740, Nov. 13, 1992, abandoned.

[51] Int. Cl.⁶ .............................................. B64D 19/00
[52] U.S. Cl. .................................... 244/149; 244/139; 102/340
[58] Field of Search ............... 244/149, 141, 142, 139, 244/900; 102/340, 342; 414/85

[56] References Cited

U.S. PATENT DOCUMENTS

| 2,490,378 | 12/1949 | Mount | 441/85 |
| 2,924,409 | 2/1960 | Burke, Jr. | 244/149 |
| 3,320,885 | 5/1967 | Foster et al. | 102/340 X |
| 3,416,755 | 12/1968 | Knoll et al. | 244/122 |
| 3,622,108 | 11/1971 | Mathewson | 244/139 |
| 3,642,236 | 2/1972 | Stanley | 244/138 |
| 3,700,192 | 10/1972 | Pleasants et al. | 244/139 |
| 3,886,612 | 6/1975 | Schnibel et al. | 9/14 |
| 4,004,764 | 1/1977 | Burklund et al. | 244/149 |
| 4,033,528 | 7/1977 | Diggs | 244/139 |
| 4,332,234 | 6/1982 | Allen | 124/73 |
| 4,445,654 | 5/1984 | Handburg et al. | 244/139 |
| 4,607,814 | 8/1986 | Popov | 244/139 X |
| 4,778,424 | 10/1988 | Lloyd | 441/85 |

FOREIGN PATENT DOCUMENTS

| 0336910 | 10/1989 | European Pat. Off. | 244/139 |
| 1136515 | 5/1957 | France | 244/139 |
| 2069425 | 8/1981 | United Kingdom | 244/139 |

Primary Examiner—Mitchell J. Hill
Assistant Examiner—Christopher P. Ellis
Attorney, Agent, or Firm—Young, MacFarlane & Wood

[57] ABSTRACT

The invention is a compressed gas rocket apparatus for deployment of emergency parachutes, rescue lines and similar payloads. A pressurized vessel is equipped with a stopping or sealing mechanism which, when removed or punctured, causes the pressure vessel to be launched. A drag line connected to the vessel pulls the payload away from the launch point, in the direction of the pressure vessel travel.

4 Claims, 5 Drawing Sheets

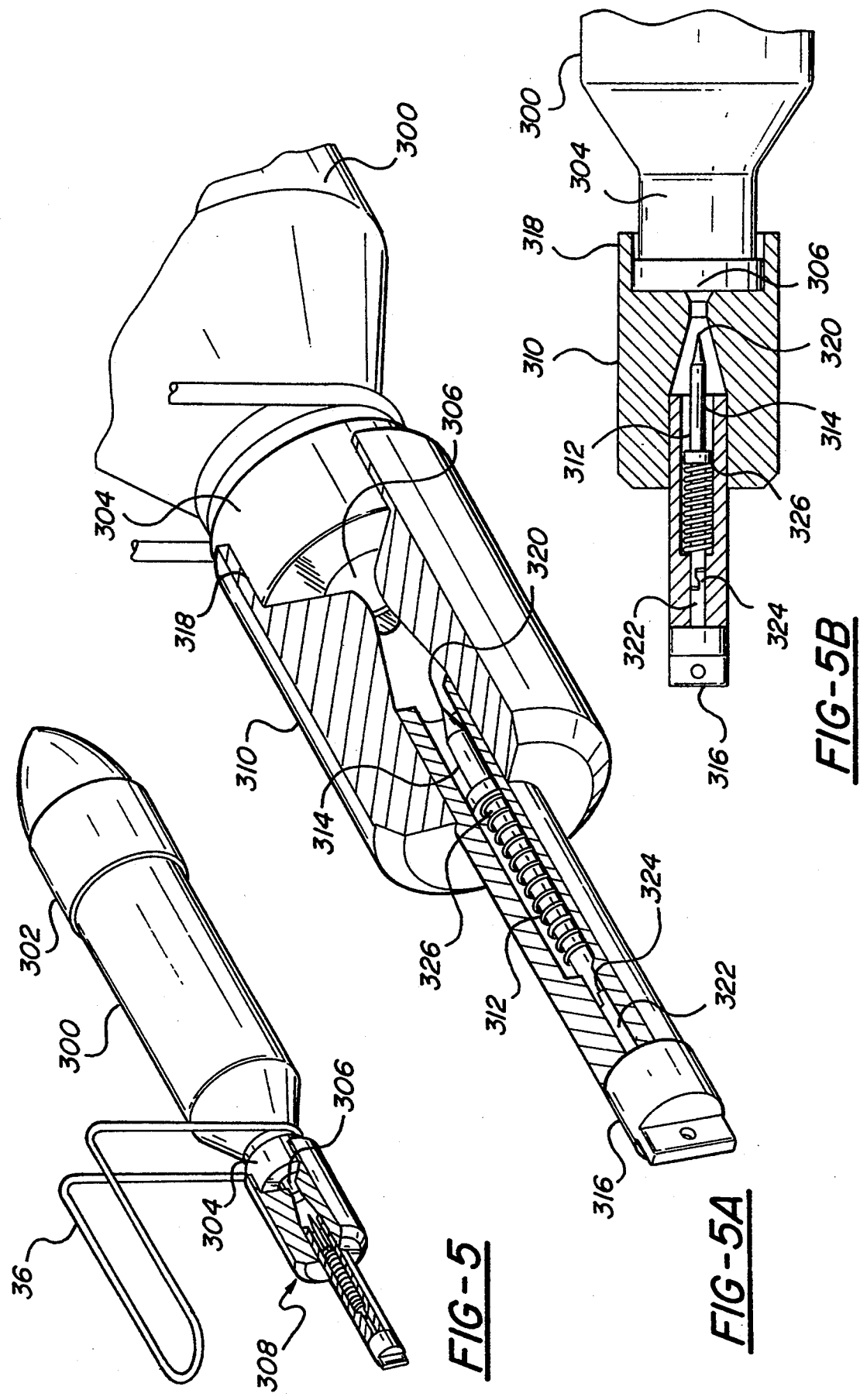

ROCKET DEPLOYMENT SYSTEM FOR PARACHUTES AND THE LIKE

This is a continuation of application Ser. No. 07/975,740 filed on Nov. 13, 1992, now abandoned.

FIELD OF THE INVENTION

The invention is an apparatus for rapid deployment of parachutes, rescue lines and similar objects, utilizing a high-pressure gas-powered rocket motor.

BACKGROUND OF THE INVENTION

Although certain specialized types of emergency parachutes, rescue lines or rescue buoys may be deployed by hand, it is desirable to extend the distance of deployment using propulsion devices.

Pilots of hang gliders and ultralight aircraft have previously used hand-deployed emergency parachutes to rescue the pilot and aircraft in the event of a catastrophic in-flight structural failure. These hand-deployed parachutes were packaged to permit mounting of the parachute and suspension lines on the pilot's person, or on the aircraft, in a position close to the pilot. The parachute canopy and suspension lines could, in an emergency, be deployed as a unit. Typically, the pilot would grasp and throw a deployment bag containing the canopy and suspension lines. The suspension lines were connected to the pilot or the aircraft by a harness, a portion of which was designed to play out during the deployment process. The pilot would hand-throw the deployment bag clear of the aircraft, and thereafter the drag from the airstream would extract the parachute canopy and suspension lines from the deployment bag.

While these devices were functional, they had a number of limitations. Most importantly, hand-deployed emergency parachutes were ineffective below a certain altitude, because of the time required for the pilot to complete the hand deployment sequence, and for the canopy to fully inflate. Further, it was difficult for the pilot, acting in an emergency situation, to propel by hand, the deployment bag in an area clear of the aircraft. In certain situations, the deployment bag would foul on the aircraft structure, rendering the parachute system inoperable.

For these and other reasons, the ballistically deployed emergency parachute was developed. Early models of the ballistically deployed parachutes were of mortar-type construction. An explosive charge was placed in the base of a cylindrical container. An emergency parachute canopy and suspension lines were tightly packed, preferably in a vacuum environment, resulting in a highly compact deployment package. The canopy and lines so packed were then placed in the cylindrical container, separated from the explosive by wadding a plunger, or similar material, to protect the canopy and suspension lines from the heat and ignition of the deployment explosion. A pyrotechnic triggering device, such as a shotgun shell, was used to initiate the explosion. The force of this explosion was sufficient to propel the canopy and its suspension lines in a desired direction well clear of the aircraft. This system was a vast improvement over the hand deployment system, but had several drawbacks. Most significant of the limitations of the motor-type system was the recoil generated by the explosion, which could distort the airframe, and have undesirable effects on the direction of deployment. More benign propulsion techniques were tried for the mortar system, including a system of compressed gas. However, in this configuration, the use of compressed gases was generally unsatisfactory, imparting insufficient propulsion to the parachute canopy package.

The current method for deployment of emergency parachutes includes both the mortar system above described, and a newer, rocket-powered deployment method. In this method, a solid propellant, explosive rocket motor is secured to a rocket body, which, in turn, is secured to the apex of the parachute canopy. The parachute canopy, together with its suspension lines, is pressure-packed in a sealed canister. The rocket is connected to the apex of the apex of the canopy by a line which passes between the lid of the container and the container wall. A pyrotechnic ignitor is used to initiate the rocket ignition. The rocket motor, propelling the rocket assembly rapidly away from the aircraft, and exerting tension on the line to the canopy, simultaneously forces open the lid of the container, and extracts the canopy, apex first. This methodology improves deployment time dramatically. Further, the rocket deployment method does not exhibit the undesirable recoil characteristics of the mortar system.

A significant disadvantage of both the rocket and mortar systems, however, is found in the use of explosive and pyrotechnic materials to initiate the deployment sequence. In addition to the possibility of a misfire, certain environmental factors, such as humidity, may render the explosive materials inoperable. More importantly, transport of these type of volatile materials presents significant obstacles to the manufacturers and retailers thereof. Because of regulatory and statutory restrictions for transport of explosive materials in aircraft, these types of parachute systems must frequently be shipped by ground or sea. If shipped by air, there are significant reporting requirements, and substantial additional costs associated with shipment.

Rocket deployment systems have also been used for the purpose of long distance deployment rescue lines, rescue buoys and the like. These deployment systems share the limitations of rocket systems used for emergency parachutes. Likewise, since the rocket deployment system for emergency rescue lines and the like are discharged by a human operator, there is a risk to the operator of injury from the combustion occurring during the rocket motor ignition.

The within invention eliminates the need for any combustible material in these deployment systems, and accordingly, overcomes the many limitations of pyrotechnic devices.

SUMMARY OF THE INVENTION

Using high pressure (1000 to 10,000 psi) gas cylinders of various sizes and materials, I have developed a method of extracting parachutes, ropes and other objects from containers. The device can be used to pull or push objects.

The device is designed to be a "cool thrust", non-explosive rocket motor, which develops thrust from its own stored energy when activated. Thrust-time curves can be adjusted by varying the design of the rocket nozzle, varying the internal pressure of the cylinder, the size of the cylinder, the gas used, and the liquid propellant volume and mass inside the container.

The device can be charged with any kind of inert gas, such as air, helium, nitrogen or carbon dioxide. The device can use an inert liquid propellant, e.g., water or ethylene glycol, to add mass to the motor exhaust, improving thrust characteristics.

The device incorporates a filling attachment that allows pressurization by the user through a built-in check-valve, using standard scuba tanks. In addition, the device can be adapted to fill from most types of gas compressor, to any pressure up to or over 10,000 psi, depending on the pressure rating of the tank utilized. In the alternative, the pressure vessel may comprise a pre-filled, sealed container which may be selectively ruptured or punctured by a pin or similar device.

The rocket nozzle expansion chamber is retained on a mount base, surrounded by a ball bearing release mechanism. The mechanism incorporates a ball bearing release collar that allows the cylinder to retain gas pressure during extended field use under adverse conditions, e.g., vibration and extreme weather fluctuations. A mechanical release allows the user to fire the rocket upon command, with minimum pull force. A ball bearing retaining collar is held in place with a stainless steel "clock spring". This spring is released upon extraction of a retaining pin, or cable, which allows the spring to unwind, thereby allowing the ball bearings to release the rocket from its launch base at a high rate of acceleration.

The rocket motor incorporates a built-in pressure gauge, allowing the user to determine when re-charging is necessary.

BRIEF DESCRIPTION OF THE DRAWINGS

FIG. 2A is a detailed view of the pressure gauge dial face; and FIG. 2B is a detail view of the rip cord assembly.

FIG. 5 is a cutaway drawing, showing an alternative embodiment of the rocket motor assembly; FIG. 5A is an enlarged cutaway perspective view of the deployment mechanism of said embodiment; and FIG. 5B is a cross-sectional side view of the deployment mechanism of said embodiment.

DESCRIPTION OF THE PREFERRED EMBODIMENT

Figure 1:
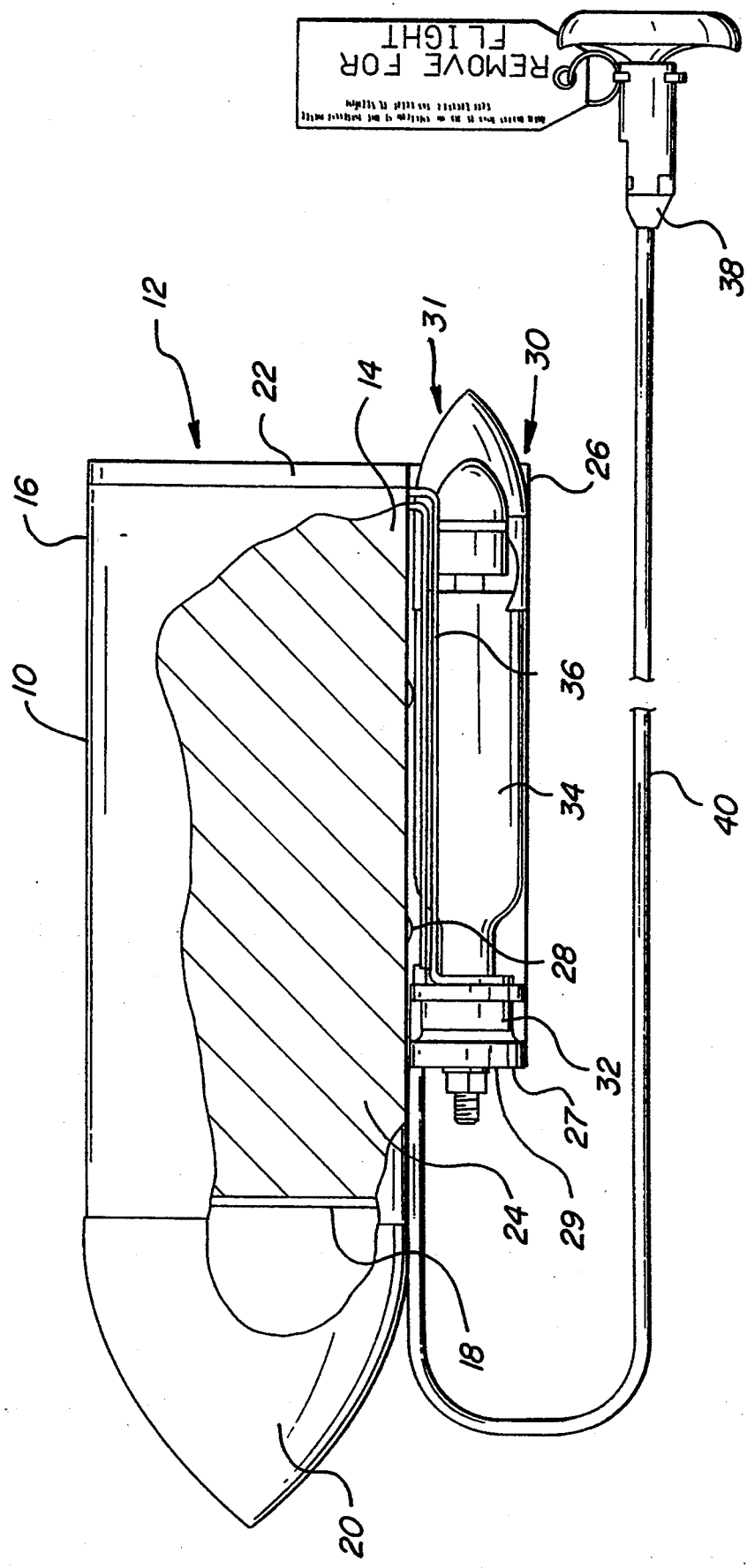
FIG. 1 is a cutaway drawing, showing a parachute canister, rocket and deployment handle.

By referring first to FIG. 1, it will be possible to understand the overall construction and combination of elements of the invention. A cylindrical container 10, preferably formed of aluminum, has a closed end 18 and a discharge end 12. Container 10 defines a compartment 14 surrounded by container wall 16 and closed end 18. A lid 22 is affixed to the discharge end 12 of container 10. On the end of container 10 opposite the lid 22, an aerodynamic cap 20 is preferably fitted to streamline the assembly. A parachute canopy with suspension lines comprises a deployment package 24. Preferably, the parachute is packed in a vacuum to insure a compact configuration.

Affixed to wall 16 is a launch tube 26, in the form of a hollow cylinder having a wall 30, a fixed end 27 and a discharge end 31. Fasteners 28 serve to affix a launch tube 26 to container 10. Fixed end 27 is provided with a hole 29 through which the rear portion of the rocket assembly 34 protrudes. The rear portion of rocket assembly 34 comprises a release assembly 32. A drag line 36 connects the rocket assembly 34 to the deployment package 24, and operates to drag the deployment package 24 from the container 10 when the rocket is fired. A rip cord assembly 38 connects through a cable housing 40 to the release assembly 32 of the rocket assembly 34.

In the preferred embodiment, the above components are attached as a unit to the structure of an aircraft, in such a fashion as to permit the operation of the rocket assembly 34 to cause the extraction of the deployment package 24 from the container 10, and to extend the parachute canopy and suspension lines contained within the deployment package 24, at some distance away from and clear of the airframe on which the invention is mounted.

Figure 2:
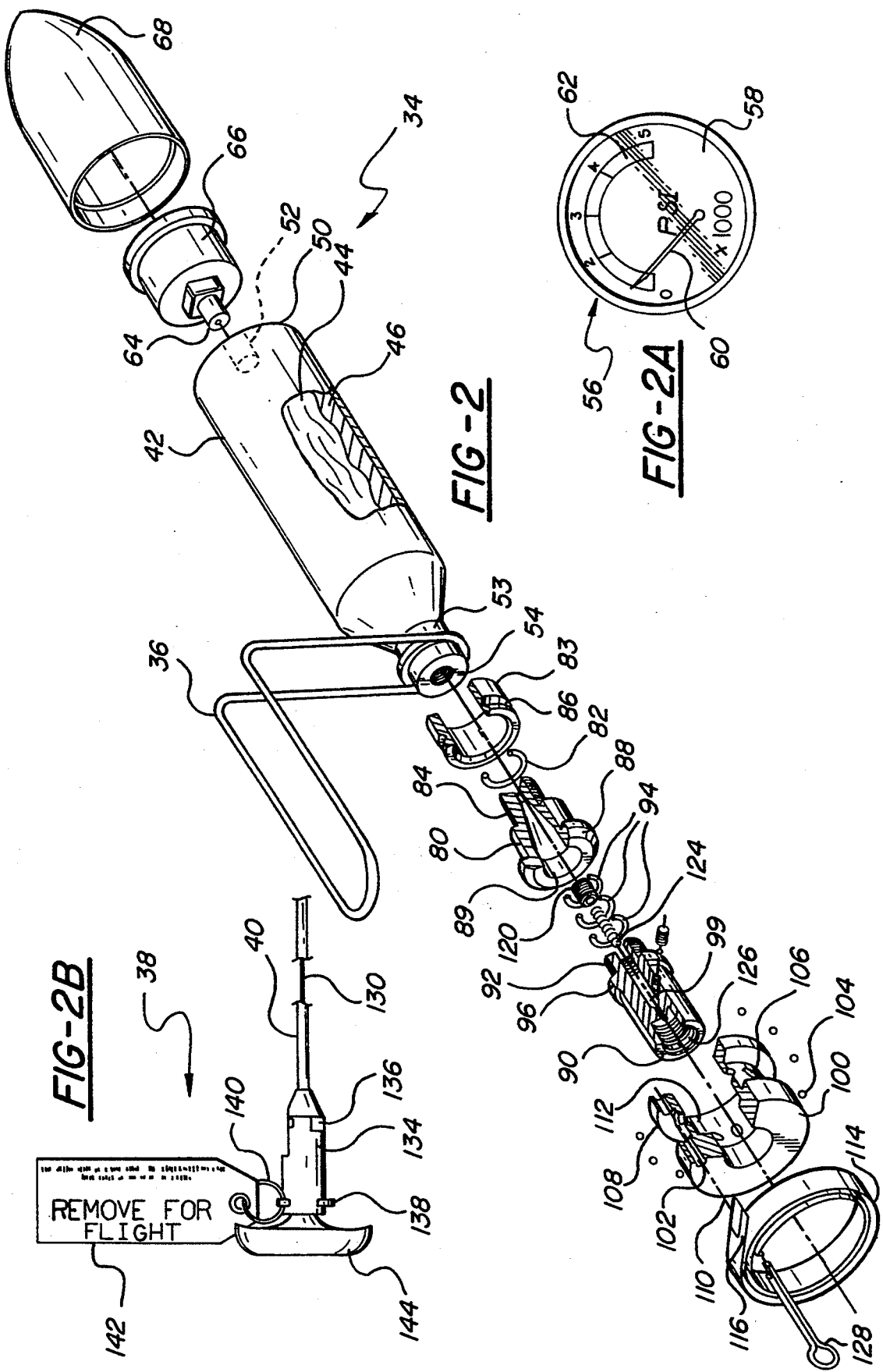
FIG. 2 is an exploded perspective view of the rocket motor assembly.

The rocket assembly 34 is shown in detail in FIGS. 2 and 2A. The main component of the rocket assembly 34 is a pressure vessel 42 which is ordinarily an aluminum bottle capable of withstanding pressures in excess of 3,000 pounds per square inch. In operation, pressure vessel 42 is charged with a pressurized, relatively inert gas 44, such as dry filtered air, argon, freon or the like. Optionally, a liquid propellant 46 can be introduced into pressure vessel 42 to add mass to the motor exhaust, improving thrust characteristics. Although any liquid may be used to enhance the thrust characteristics, it is preferred to use ethylene glycol, or mixtures of ethylene glycol and water as the liquid propellant 46, due to the low freezing temperatures exhibited by such fluids. A forward end surface 50 of the pressure vessel 42 is provided with a first threaded opening 52 adapted to receive a threaded connector 64 from a pressure gauge 56. On the end of the pressure vessel opposite the first threaded opening is a neck 53 provided with a threaded opening 54.

The pressure gauge 56 is provided with a face 58 with range markings 62. A dial indicator 60 registers the internal pressure of pressure vessel 42 on the face 58 of the dial indicator 60.

The gauge 56 fits within a case 66 of a diameter equal to or smaller than the diameter of the pressure vessel 42. Nose cone 68 is affixed to the forward end of pressure vessel 42.

Rocket nozzle 80 is machined with a threaded coupling 84 at one end thereof. A flexible O-ring 82 surrounds the threaded coupling, and serves to seal the threaded opening 54 against the nozzle 80. Clamping collar 83 surrounds nozzle 80, and is secured to the outer circumference of neck 57 when nozzle 80 is screwed into opening 54. Drag line 36 is captured between the collar 83 and the neck 53 by friction, when the threaded coupling 84 of nozzle 80 is screwed into the first threaded opening 52 of pressure vessel 42. Collar 83 is provided with a groove 86 near the propulsion end 88 of nozzle 80. As will be described herein, groove 86 cooperates with the remaining portions of the assembly to effectuate rocket firing. The nozzle opening 89 of nozzle 80 is closed with a plug 90, which serves to retain compressed gas 44 and liquid propellant 46 until such time as activation of the rocket is required. The plug 90 features a connector section 92 which is equipped with a plurality of O-rings 94. The plug connector 92, with its O-rings attached, is a friction fit into nozzle opening 89, providing a pressure-tight seal between the interior of the pressure vessel and the atmosphere.

To prevent the pressure of the compressed gas 44 within the pressure vessel 42 from ejecting the plug 90 from the neck 53 of pressure vessel 42, a bearing cage 100 captures plug 90. The body 98 of plug 90 is provided with a shoulder base 96.

As can be seen from FIG. 2, bearing cage 100 is formed from a unitary block of material, such as aluminum, and is provided with a bore 112 in which the body 98 of plug assembly 90 is pressed fit. In the assembled configuration, a plurality of openings 106 are aligned with the groove 86 of collar 83. When assembled with nozzle 80, bearing cage 100 and plug assembly 90 insure that connector 92 with attached O-rings 94 is fully inserted in nozzle opening 89 of nozzle 80. To prevent the pressure of the compressed gas 44 contained within pressure vessel 42 from ejecting the combination of the bearing cage 100 and plug assembly 90 from the nozzle opening 89, a plurality of ball bearings 104 are inserted in openings 106, where they engage a groove 86 in collar 83. To retain ball bearings 104 in contact with the sides of groove 86, a clock spring 114 is tightly wound around the body of bearing cage 100, making pressure contact with ball bearings 104. This pressure effectively squeezes ball bearings 104 into the groove 86 in collar 83 locking the bearing cage 100 and its attached plug assembly 90 together with nozzle 80. A release pin bore 102 is machined into the base 110 and forward flange 108 of bearing cage 100. Clock spring 114 is provided with a catch 116 in the form of a turned up end of the clock spring material. When the clock spring 114 is wound tightly around bearing cage 100, catch 116 is aligned with release pin bore 102, so that a release pin 128 may be inserted through the release pin bore 102, retaining catch 116 of clock spring 114, to insure that clock spring 114 remains tightly wound about bearing cage 100.

The body 98 of the plug assembly 90 is provided with a throughbore 99 which communicates with the opening in nozzle 80. This throughbore 99 is threaded to accept a first threaded plug 120 of a check valve assembly. The check valve assembly contains a spring loaded check ball 124, which serves to provide a seal between the interior of pressure vessel 42 and the atmosphere. A filler opening 126 in plug assembly 90 is adapted to accept a hose fitting from a high pressure filling device, and in this fashion, the pressure vessel 42 may be charged with compressed gas 44.

Referring now to FIG. 2B, the rip cord assembly 38 comprises an actuation cable 130 to which is affixed a release pin 128 (shown in FIG. 2). Actuation cable 130 travels in cable housing 40. On the end of the actuation cable opposite the release pin is actuation handle body 134, which is adapted to be mounted to the air frame by way of mounting holes 136. A safety pin 138 secures handle 144 within the handle body 134, to prevent accidental activation of the handle. Safety pin 138 is provided with a warning flag 142, which is attached to the pin 138 by a link 140. Preferably, the warning flag is brightly colored, and contains the admonition "remove for flight" or a similar warning to insure that the safety pin is removed, thereby arming the system for use prior to flight.

To operate the assembly, the pilot first removes the safety pin 138, link 140 and warning flag 142 assembly combination as above described. Preferably, this is done prior to flight. In an emergency situation, the pilot pulls handle 144, which in turn, causes movement of actuation cable 130 within the cable housing 40, resulting in the extraction of release pin 128 from release pin bores 102. As soon as the release pin 128 has been withdrawn from the release pin bores 102 in bearing cage 100, clock spring 114 unwinds, releasing the pressure on ball bearings 104, which are then free to retract away from the groove 86 in the collar 83. Upon withdrawal of the ball bearings 104 from groove 86, bearing cage 100 and plug assembly 90 are no longer secured to the nozzle assembly, and the pressure exerted by the compressed gas 44 within the pressure vessel 42 rapidly ejects the pressure vessel 42 and nozzle away from the bearing cage 100. The pressure vessel 42 pulls drag line 36 rapidly away from the ball bearing release cage, which is secured to the launch tube 26. As drag line 36 extends to its full length, it exerts pressure on discharge package 24, which in turn, causes the lid 22 of the container 10 to open, allowing further extraction of the discharge package.

Figure 4B:
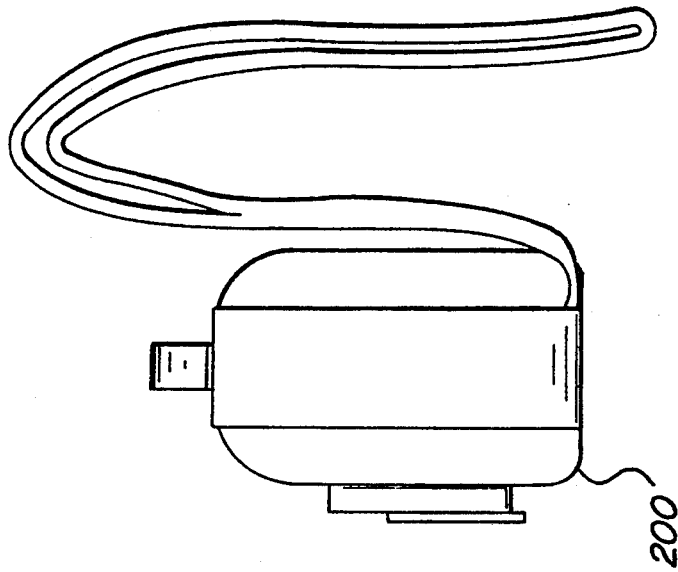
FIG. 4B is a side view of a typical container used in conjunction with the second embodiment of the invention.
Figure 4A:
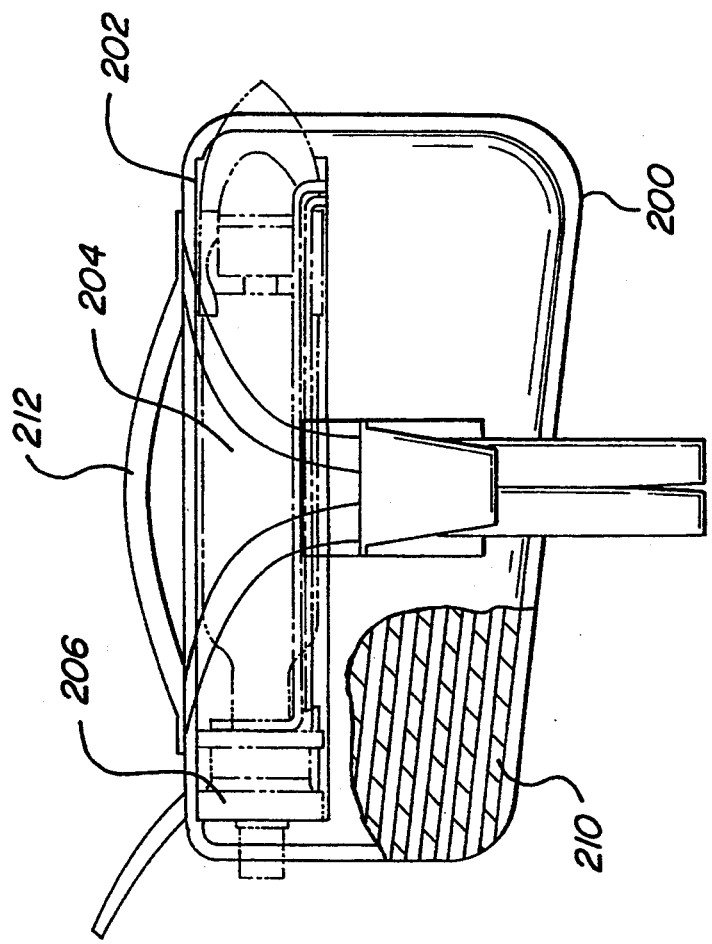
FIG. 4A is a second embodiment of the invention showing, in partially cutaway perspective view, a typical combination of the rocket deployment apparatus in conjunction with an emergency rescue line apparatus.

In a second embodiment, as depicted in FIG. 4A, the container 200, launch tube 202, rocket assembly 204 and release assembly 206 are shown, in combination, as an emergency line deploying device. In this embodiment, an emergency rescue line 210, such as a rope, or a rope terminated by a flotation device 211, are packed in a semi-rigid container 200 capable of being stored on board a ship or other vehicle, and carried by a person, for example, by handle 212. (FIG. 4B depicts a typical semi-rigid container 200). The rocket assembly 204 is affixed to one end of a rescue line 210, with the other end of the rescue line affixed to the container 200. Discharge of the rocket assembly permits remote deployment used for parachutes and their associated suspension lines.

Figure 3:
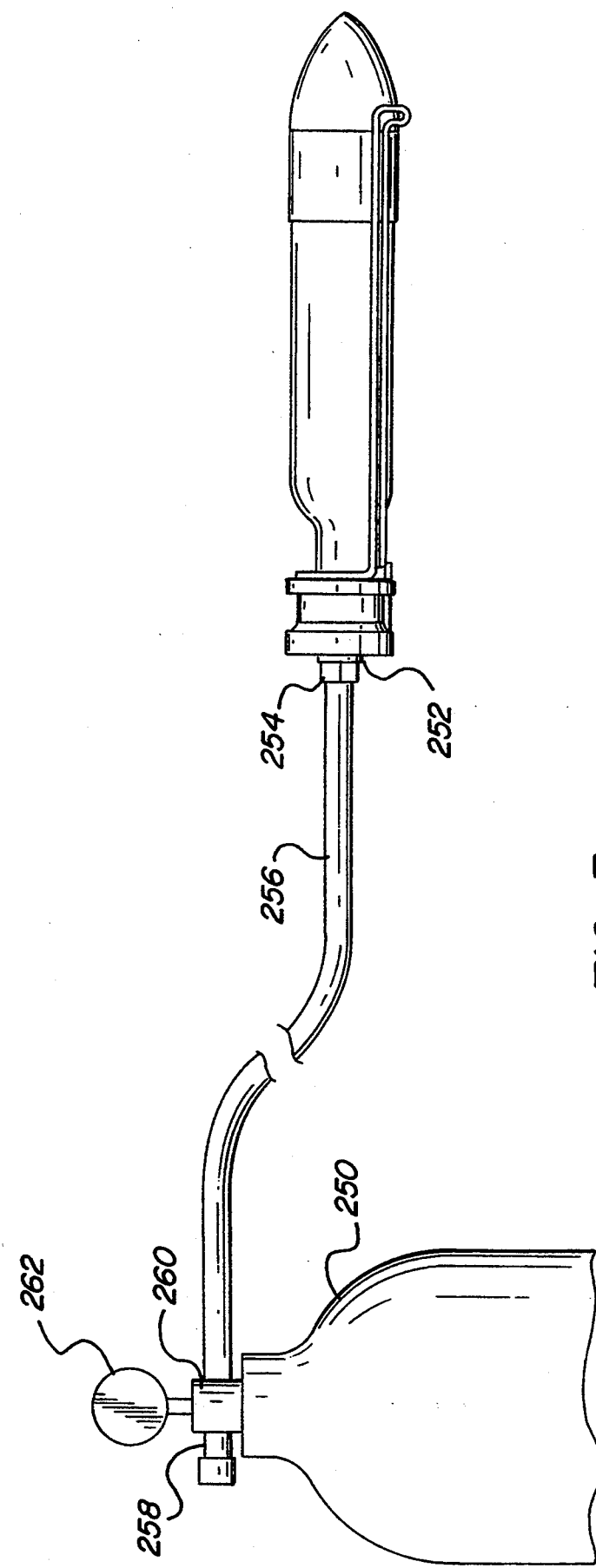
FIG. 3 is a diagrammatic view depicting the recharging of the rocket motor device.

As can be seen in FIG. 3, the invention is designed to be refilled from a standard scuba tank 250, gas storage tank or compressor. The rocket assembly valve means 252 is provided with a threaded fitting to accept a complementary fitting 254, which is in turn connected to a filler hose 256. The filler hose 256 is adapted to be connected to a tank 250 or other high pressure gas source, through a valve means 258 and regulator 260. Typically, a pressure gauge 262 is provided to monitor the pressure of the source tank or supply. The valve means 258 are operated to inject high pressure gas into the pressure vessel of the rocket assembly 34 through a check valve in the rocket assembly 34 as above described. Removal of the complementary fitting 254 from the check valve simultaneously disconnects the rocket assembly 34 from the filler hose 256, and allows the check valve to close, sealing the interior chamber of the pressure vessel 42 from the atmosphere, and maintaining the pressurization therein.

In an alternative embodiment of the present invention shown in FIG. 5, a pre-filled, sealed pressure vessel 300 is used as the main component of the rocket assembly 34. The pressure vessel 300 has a forward end 302 and a discharge end 304 with a sealed puncture zone 306. The rocket assembly 34 is activated by puncturing the pressure vessel 300 with a deployment mechanism 308 affixed to the discharge end 304 proximate the puncture zone 306. The material used for the puncture zone 306 must be strong enough to maintain the pressurized integrity of the pressure vessel 300 yet be relatively easy to pierce with a sharp object. The preferred material for the puncture zone 306 is a thin, soft metal such as aluminum.

The deployment mechanism 308, best shown in FIGS. 5A and 5B, comprises a housing 310 with a bore 312 therethrough, a spring-released firing pin 314 friction-fit within the bore 312, and a firing cap 316 outside the housing 310. The housing 310 has a rim 318 which is configured as a friction fit to securely fit over the discharge end 304 of the pressure vessel 300 such that the bore 312 is in alignment with the puncture zone 306. The spring-released firing pin 314 is suspended within the bore 312 such that the sharp end 320 of the firing pin 314 is in alignment with the puncture zone 306. The firing cap 316 is connected to a shaft 322 with a detachable notched juncture 324 which is also friction-fit within the bore 312 proximate the spring end 326 of the firing pin 314.

To operate the assembly, the pilot grasps the handle 144 and pulls it away from the handle body 134. Actuation cable 130 pulls causing compression of the spring-released firing pin and exposure of the notched juncture 324 outside of the housing 310. In the absence of the lateral pressure provided by the walls of the bore 312, the notched juncture 324 snaps apart. When this happens, the firing cap 316 falls away and the compressed spring of the firing pin 314 expands, causing the sharp end 320 of the firing pin 314 to puncture the puncture zone 306, thus separating housing 310 from vessel 300, thereby launching the pressure vessel 300 and triggering release of the discharge package 24. This methodology simplifies the discharge of the invention, eliminating the requirement for the ball bearing release mechanism previously described, and provides a pre-pressurized vessel which does not require charging prior to use.

Having thus described my invention, numerous, obvious modifications may be seen as beneficial thereto by those skilled in the art, without departing from the essence of the invention, which I claim as follows:

I claim:

1. A device, designed to be mounted to the structure of an aircraft, for deploying a payload to a point remote from the operator of said device, said device comprising:
   a rigid container containing said payload, said container defining a compartment having a closed end and a discharge end having a lid affixed thereto;
   a rocket powered by compressed gas removably affixed to said container;
   means connecting said rocket to said payload;
   means for discharging said rocket whereby said connecting means extracts said payload from said discharge end of said container, causing said lid to be opened; and
   a valve removably attached to said rocket to permit refillability of said rocket by an external source of compressed gas.

2. The invention of claim 1, wherein said payload comprises a parachute and suspension lines.

3. A device, mounted to the structure of an aircraft, for deploying a payload to a point remote from the operator of said device, said device comprising:
   a rigid container containing said payload, said container defining a compartment having a closed end and a discharge end, said discharge end having a lid affixed thereto;
   a launch tube affixed to said container;
   a compressed gas powered rocket removably contained within said launch tube, said rocket having a discharge end;
   nozzle means affixed to the discharge end of said rocket;
   plug means removable from and sealing said nozzle;
   clamping means securing said plug means to said nozzle means;
   release means secured to said launch tube and said clamping means;
   means connecting said rocket to said payload;
   means for discharging said rocket whereby said connecting means extracts said rocket from said discharge end of said container, causing said lid to be opened; and
   a valve removably attached to said rocket to permit refillability of said rocket by an external source of compressed gas.

4. A device, designed to be mounted to the structure of an aircraft, for deploying a payload to a point remote from the operator of said device, said device comprising:
   a rigid container containing said payload, said container defining a compartment having a closed end and a discharge end having a lid affixed thereto;
   a rocket powered by compressed gas removably affixed to said container;
   means connecting said rocket to said payload;
   means for discharging said rocket whereby said connecting means extracts said payload from said discharge end of said container, causing said lid to be opened;
   a valve removably attached to said rocket to permit refillability of said rocket by an external source of compressed gas; and
   a gauge, affixed to said rocket, providing visual indicia of the quantity of compressed gas in said rocket.

* * * * *